United States Patent [19]

Uchiyama et al.

[11] Patent Number: 5,727,093
[45] Date of Patent: Mar. 10, 1998

[54] IMAGE PROCESSING METHOD AND APPARATUS THEREFOR

[75] Inventors: Shinji Uchiyama, Yokohama; Hiroyuki Yamamoto, Chigasaki, both of Japan

[73] Assignee: Canon Kabushiki Kaisha, Tokyo, Japan

[21] Appl. No.: 597,699

[22] Filed: Feb. 6, 1996

[30] Foreign Application Priority Data

Feb. 7, 1995 [JP] Japan .................. 7-019063
Sep. 1, 1995 [JP] Japan .................. 7-225182

[51] Int. Cl.$^6$ .................................................. G06K 9/32
[52] U.S. Cl. ................................. 382/294; 382/284
[58] Field of Search ........................... 382/293, 294, 382/284, 154; 358/450; 348/48, 36

[56] References Cited

U.S. PATENT DOCUMENTS

| | | | |
|---|---|---|---|
| 4,373,169 | 2/1983 | Birleam | 348/36 |
| 5,222,158 | 6/1993 | Takasaki et al. | 382/284 |
| 5,285,786 | 2/1994 | Fujii | 382/284 |
| 5,384,588 | 1/1995 | Martin et al. | 348/36 |
| 5,392,388 | 2/1995 | Gibson | 395/339 |
| 5,444,478 | 8/1995 | LeLong et al. | 348/39 |
| 5,606,627 | 2/1997 | Kuo | 382/294 |
| 5,646,677 | 7/1997 | Reber | 348/36 |

FOREIGN PATENT DOCUMENTS

| | | | |
|---|---|---|---|
| 0498542 | 8/1992 | European Pat. Off. | |
| 0605045 | 7/1994 | European Pat. Off. | H04N 7/18 |

*Primary Examiner*—Yon J. Couso
*Attorney, Agent, or Firm*—Fitzpatrick, Cella, Harper & Scinto

[57] ABSTRACT

In order to obtain a field angle wider than that determined by a lens of a photographing apparatus by means of image processing, a given image is selected as a reference image from a still image train acquired by photographing an object by time-serially changing the visual point position and direction, a procedure for coordinate-transforming specific points in the respective images onto a two-dimensional coordinate system identical to that of the reference image is derived, a two-dimensional space is Voronoi-divided in correspondence with the specific points based on the derived procedure, the respective images are coordinate-transformed using a coordinate transform procedure for transforming the respective images to the reference images, and the coordinate information of each of the coordinate-transformed images is inserted in one of the Voronoi domains including the specific points of the respective images.

7 Claims, 17 Drawing Sheets

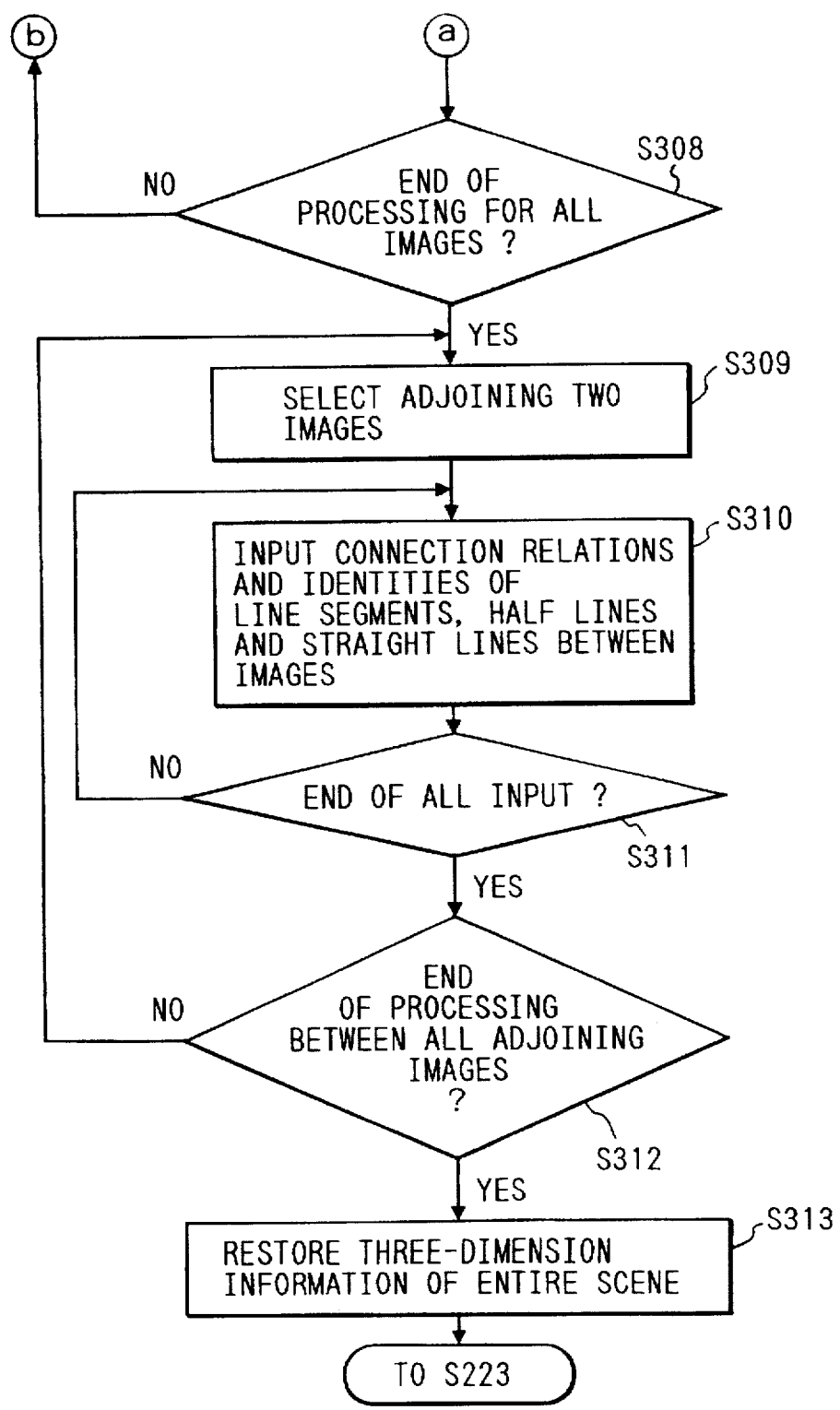

IMAGE PROCESSING METHOD AND APPARATUS THEREFOR

BACKGROUND OF THE INVENTION

1. Field of the Invention

The present invention relates to an image processing method and an apparatus therefor and, more particularly, to a technique suitably used for an image processing method and an apparatus therefor, which can acquire an image with a sufficiently wide field angle as compared to the field angle of a photographing apparatus used in a photographing operation.

Also, the present invention relates to a method of rearranging the form and external pattern of an object in a three-dimensional scene and an apparatus therefor.

2. Related Background Art

As an image input apparatus for inputting an image with a sufficiently wide field angle, an image input apparatus which photographs and inputs an image using a lens having a wide field angle such as a fisheye lens is known. Since the fisheye lens has a very wide field angle, the image input apparatus using it can input an image with a very wide field angle.

However, the image input apparatus using the conventional technique cannot acquire an image having a field angle larger than that determined by the fisheye lens even when a lens with a wide field angle such as a fisheye lens is used.

When the form and external pattern of an object in a three-dimensional scene (e.g., in a room) are to be three-dimensionally rearranged, a geometric model is created by one of various methods: (1) a method of using a geometric form model obtained by modelling a geometric form using a CAD; (2) a method of creating a geometric form model by inputting the geometric form on the basis of numerical value data of a design drawing; (3) a method of creating a geometric form model by obtaining numerical values by measuring the heights and widths of walls in an actual room using, e.g., a tape measure; and the like. Meanwhile, a pattern image is separately prepared as a pattern on the surface of the form model. Then, a three-dimensional space is constructed by the texture mapping technique. As the pattern image to be separately prepared, an actually photographed image, an image created by the computer graphics technique, and the like may be used.

However, in the conventional method, when no numerical value data such as a design drawing are available, or when no form model data created by the CAD is available, the heights and widths of walls of an actual building must be measured using, e.g., a tape measure, and a geometric form model cannot be easily created based on a photograph of the building without such cumbersome works.

SUMMARY OF THE INVENTION

It is an object of the present invention to obtain an image with a wider field angle than that determined by a lens of a photographing apparatus in consideration of the above-mentioned problems.

It is another object of the present invention to provide a method of rearranging the form and external pattern of an object in a three-dimensional scene and an apparatus therefor, which allow to easily create a geometric form model on the basis of, e.g., a photograph of a building without requiring any measurement of the heights and widths of walls of an actual building, in consideration of the above-mentioned problems.

An image processing method of the present invention executes: image input processing for inputting a still image train obtained by photographing an object while time-serially changing a visual point position and direction; reference image determination processing for determining one image of the still image train input by the image input processing as a reference image; specific point selection processing for selecting, as specific points, identical points photographed in two adjoining images of images constituting the still image train; first procedure derivation processing for deriving a procedure for coordinate-transforming one of the adjoining images to the other image so that the specific points selected in the specific point selection processing match each other between the adjoining images; second procedure derivation processing for deriving a procedure for coordinate-transforming the specific points transformed by the procedure derived by the first procedure derivation processing onto a two-dimensional coordinate system identical to a two-dimensional coordinate system of the reference image; division processing for dividing a two-dimensional space to which the reference image belongs into a plurality of domains in correspondence with the specific points transformed by the procedure derived by the second procedure derivation processing; coordinate transformation processing for coordinate-transforming the images of the still image train onto the two-dimensional space to which the reference image belongs; and wide angle image production processing for producing a single image as a whole by inserting coordinate information of each of the images coordinate-transformed onto the two-dimensional space to which the reference image belongs into each of the divided domains divided in correspondence with the specific points of the images.

According to another feature of the image processing method of the present invention, an image processing method comprises: the first step of inputting a still image train obtained by photographing an object while time-serially changing a visual point position and direction; the second step of selecting one image from the still image train as a reference image; the third step of deriving a coordinate transformation procedure for transforming one of adjoining images to the other image so that pixels correspond to each other between the adjoining images in the still image train; the fourth step of deriving a coordinate transformation procedure for transforming the respective images to the reference image using the coordinate transformation procedure derived in the third step; the fifth step of transforming specific points in the respective images to a two-dimensional coordinate system identical to a two-dimensional coordinate system of the reference image using the coordinate transformation procedure derived in the fourth step; the sixth step of Voronoi-dividing a two-dimensional space on the basis of the specific points which are transformed to the two-dimensional coordinate system identical to the two-dimensional coordinate system of the reference image; the seventh step of coordinate-transforming the respective images using a coordinate transformation procedure for transforming the respective images to the reference image; and the eighth step of producing a single image by inserting coordinate information of each of the coordinate-transformed images into each of Voronoi domains including specific points of the images.

In the image processing method of the present invention, a distance used upon calculation of territories of the respective divided domains in the sixth step is a two-dimensional Euclidean distance.

According to still another feature of the image processing method of the present invention, a distance used upon calculation of territories of the respective divided domains in the sixth step is a distance derived from a calculation formula taking elements other than a two-dimensional Euclidean distance into consideration.

According to a feature of an image processing apparatus of the present invention, an image processing apparatus comprises: image input means for inputting a still image train obtained by photographing an object while time-serially changing a visual point position and direction; reference image selection means for selecting one image from the still image train as a reference image; first derivation means for deriving a coordinate transformation procedure for transforming one of adjoining images to the other image so that pixels correspond to each other between the adjoining images in the still image train; second derivation means for deriving a coordinate transformation procedure for transforming the respective images to the reference image using the coordinate transformation procedure derived by the first derivation means; first coordinate transformation means for transforming specific points in the respective images to a two-dimensional coordinate system identical to a two-dimensional coordinate system of the reference image using the coordinate transformation procedure derived by the second derivation means; Voronoi division means for Voronoi-dividing a two-dimensional space on the basis of the specific points which are transformed to the two-dimensional coordinate system identical to the two-dimensional coordinate system of the reference image; second coordinate transformation means for coordinate-transforming the respective images using a coordinate transformation procedure for transforming the respective images to the reference image; and wide angle image production means for producing a single image by inserting coordinate information of each of the coordinate-transformed images into each of Voronoi domains including specific points of the images.

According to another feature of the image processing apparatus of the present invention, a distance used upon calculation of territories of the respective divided domains in the Voronoi division processing is a two-dimensional Euclidean distance.

According to still another feature of the image processing apparatus of the present invention, a distance used upon calculation of territories of respective divided domains in the Voronoi division processing is a distance derived from a calculation formula taking elements other than a two-dimensional Euclidean distance into consideration.

Since the present invention comprises the above-mentioned arrangement, images which have time-varying visual point positions and directions can be superposed on a two-dimensional coordinate system identical to that of a reference image such that specific points in the images match each other between adjoining images. Thus, a single image having a wide field angle, i.e., a field angle from that of the first image to that of the last images of the input still image train can be produced by the image processing.

A rearranging method for the form and external pattern of an object in a three-dimensional scene according to the present invention is a rearranging method for three-dimensionally rearranging a shape and external pattern of an object in a three-dimensional scene, comprising the steps of: rearranging a three-dimensional form on the basis of a group of a plurality of images obtained by photographing a three-dimensional space from a plurality of visual points; producing an external pattern of a form area, which is exactly or substantially equal to a uniform plane, from one or a plurality of images of the group of the plurality of images; designating an area and position, corresponding to the external pattern, of the three-dimensional form; and storing the external pattern in correspondence with the designated area and position of the three-dimensional form.

The step of rearranging the three-dimensional form comprises the steps of: extracting or designating edge lines in a three-dimensional structure from the respective images; designating connection relation information and connection angle information of edge lines obtained from known structural information in association with each of the designated edge lines in the respective images; restoring three-dimensional form information on the basis of the connection relation information and the connection angle information designated in the step of designating the connection relation information and the connection angle information; designating connection relation information of the edge lines on the basis of known structural information between a plurality of images; and uniting the restoration results between the plurality of images on the basis of the connection relation information designated in the step of designating the connection relation information, and restoring a form of a portion, which cannot be restored, on the basis of the connection relation information between the plurality of images. The step of rearranging the three-dimensional form comprises the steps of: selecting two images photographed from neighboring visual point directions from the group of the plurality of images photographed from the plurality of visual points; extracting or designating edge lines in a three-dimensional structure from the selected images; designating connection relation information and connection angle information of edge lines obtained from known structural information in association with each of the designated edge lines in the selected images; restoring three-dimensional form information by designating identical edge lines between the two images and calculating a three-dimensional position on the basis of a principle of triangulation; designating connection relation information of the edge lines on the basis of known structural information between a plurality of images; and uniting the restoration results between the plurality of images on the basis of the connection relation information designated in the step of designating the connection relation information, and restoring a form of a portion, which cannot be restored, on the basis of the connection relation information between the plurality of images. The step of producing the external pattern comprises the step of cutting off the area, which is exactly or substantially equal to the uniform plane, from an image from which the entire area is acquired; and performing distortion correction and color/density correction for an external pattern in the cut-off area. The step of performing the distortion correction and the color/density correction comprises all or some of the steps of: correcting geometric distortion when the cut-off area suffers the geometric distortion caused when a photographing surface is not parallel to a photographing area; correcting a nonuniform shade and density when neither a uniform shade nor density are obtained under an influence of a position and light amount of a light source; and correcting a portion concealed by an obstacle or the like by an interpolation or extrapolation if the portion is present. The step of cutting off the area comprises the steps of: when the area, which is exactly or substantially equal to the plane, is acquired across a plurality of images, producing a single large image by uniting the plurality of images; and cutting off the pattern area from the produced large image.

A rearranging apparatus for rearranging the form and external pattern of an object in a three-dimensional scene according to the present invention is a rearranging apparatus for three-dimensionally rearranging a form and external pattern of an object in a three-dimensional scene, comprising: input means for inputting a group of a plurality of images including a plurality of single eye two-dimensional images acquired by photographing a three-dimensional space from a plurality of visual points; rearranging means for rearranging a three-dimensional form from the group of the plurality of images; production means for producing an external pattern of a form area, which is exactly or substantially equal to a uniform plane, from one or a plurality of images of the group of images; designation means for designating an area and position, corresponding to the external pattern, of the three-dimensional form; and storage means for storing the external pattern in correspondence with the designated area and position of the three-dimensional form.

The rearranging means comprises: first designation means for designating edge lines in a three-dimensional structure in the respective single eye two-dimensional images, and designating connection relation information and connection angle information of the edge lines obtained from known structural information; first restoration means for restoring three-dimensional form information on the basis of the connection relation information and the connection angle information designated by the first designation means; second designation means for designating connection relation information of the edge lines on the basis of known structural information between a plurality of images; and second restoration means for uniting the restoration results of the first restoration means between the plurality of images on the basis of the connection relation information designated by the second designation means, and restoring a form of a portion, which cannot be restored, on the basis of the connection relation information between the plurality of images. The rearranging means comprises: selection means for selecting two images photographed from neighboring visual point directions from the group of the single eye two-dimensional images photographed from the plurality of visual points; first designation means for designating edge lines in a three-dimensional structure in the selected single eye two-dimensional images, and designating connection relation information and connection angle information of the edge lines obtained from known structural information; third restoration means for restoring three-dimensional form information by designating identical edge lines between the two images and calculating a three-dimensional position on the basis of a principle of triangulation; second designation means for designating connection relation information of the edge lines on the basis of known structural information between a plurality of images; and fourth restoration means for uniting the restoration results of the third restoration means between the plurality of images on the basis of the connection relation information designated by the second designation means, and restoring a form of a portion, which cannot be restored, on the basis of the connection relation information between the plurality of images. The production means comprises cut-off means for cutting off the area, which is exactly or substantially equal to the uniform plane, from an image from which the entire area is acquired; and correction means for performing distortion correction and color/density correction for an external pattern in the cut-off area. The correction means corrects geometric distortion when the cut-off area suffers the geometric distortion caused when a photographing surface is not parallel to a photographing area, corrects a nonuniform shade and density when neither a uniform shade nor density are obtained under an influence of a position and light amount of a light source, and corrects a portion concealed by an obstacle or the like by an interpolation or extrapolation if the portion is present. The cut-off means comprises: means for, when the area, which is exactly or substantially equal to the plane, is acquired across a plurality of images, producing a single large image by uniting the plurality of images; and means for cutting off the pattern area from the produced large image.

A rearranging method for the form and external pattern of an object in a three-dimensional scene according to the present invention is a rearranging method for three-dimensionally rearranging a shape and external pattern of an object in a three-dimensional scene, comprising the steps of: rearranging a three-dimensional form on the basis of a group of a plurality of images obtained by photographing a three-dimensional space from a plurality of visual points; producing an external pattern of a form area, which is exactly or substantially equal to a uniform plane, from one or a plurality of images of the group of the plurality of images; storing the external pattern, on the basis of designation of a correspondence between the external pattern, and an area and position of the three-dimensional form, in correspondence with the designated area and position of the three-dimensional form; and producing a three-dimensional form and external pattern from a desired visual point on the basis of the rearranged three-dimensional form and the external pattern when the desired visual point is designated.

DESCRIPTION OF THE PREFERRED EMBODIMENTS

(a) First Embodiment

An embodiment of an image processing method and an apparatus therefor according to the present invention will be described in detail below with reference to the accompanying drawings.

Figure 1:
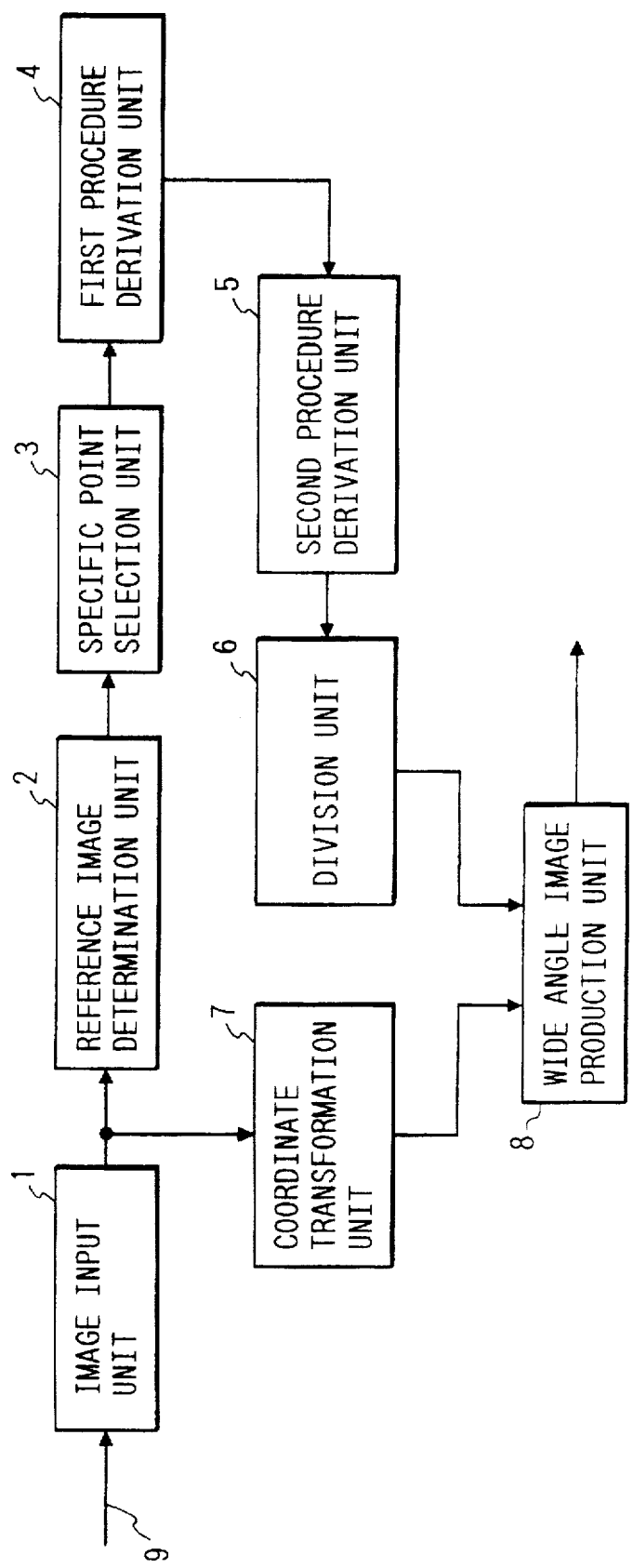
FIG. 1 is a schematic functional diagram showing the arrangement of an image processing apparatus of the present invention.

FIG. 1 is a functional diagram showing an example of an image processing apparatus of this embodiment. As shown in FIG. 1, the image processing apparatus of this embodiment comprises an image input unit 1, a reference image determination unit 2, a specific point selection unit 3, a first procedure derivation unit 4, a second procedure derivation unit 5, a division unit 6, a coordinate transformation unit 7, and a wide angle image production unit 8.

The image input unit 1 inputs a still image train 9 obtained by photographing an image by changing the visual point position and direction in the time domain.

The reference image determination unit 2 determines a given image as a reference image from the still image train input by the image input unit 1.

The specific point selection unit 3 selects, as specific points, identical points in the respective photographed images constituting the still image train 9.

The first procedure derivation unit 4 derives a procedure for coordinate-transforming one of adjoining images to the other image so that the specific points selected by the specific point selection unit 3 match each other between the adjoining images.

The second procedure derivation unit 5 derives a procedure for coordinate-transforming the specific points transformed by the procedure derived by the first procedure derivation unit 4 onto a two-dimensional coordinate system identical to that of the reference image.

The division unit 6 divides a two-dimensional space to which the reference image belongs into a plurality of domains in correspondence with the specific points transformed by the procedure derived by the second procedure derivation unit 5.

The coordinate transformation unit 7 coordinate-transforms the respective images of the still image train 9 onto the two-dimensional space to which the reference image belongs.

The wide angle image production unit 8 produces a single image as a whole by inserting coordinate information of each of images coordinate-transformed onto the two-dimensional space to which the reference image belongs into each of the domains divided in correspondence with the specific points of the images.

Figure 2:
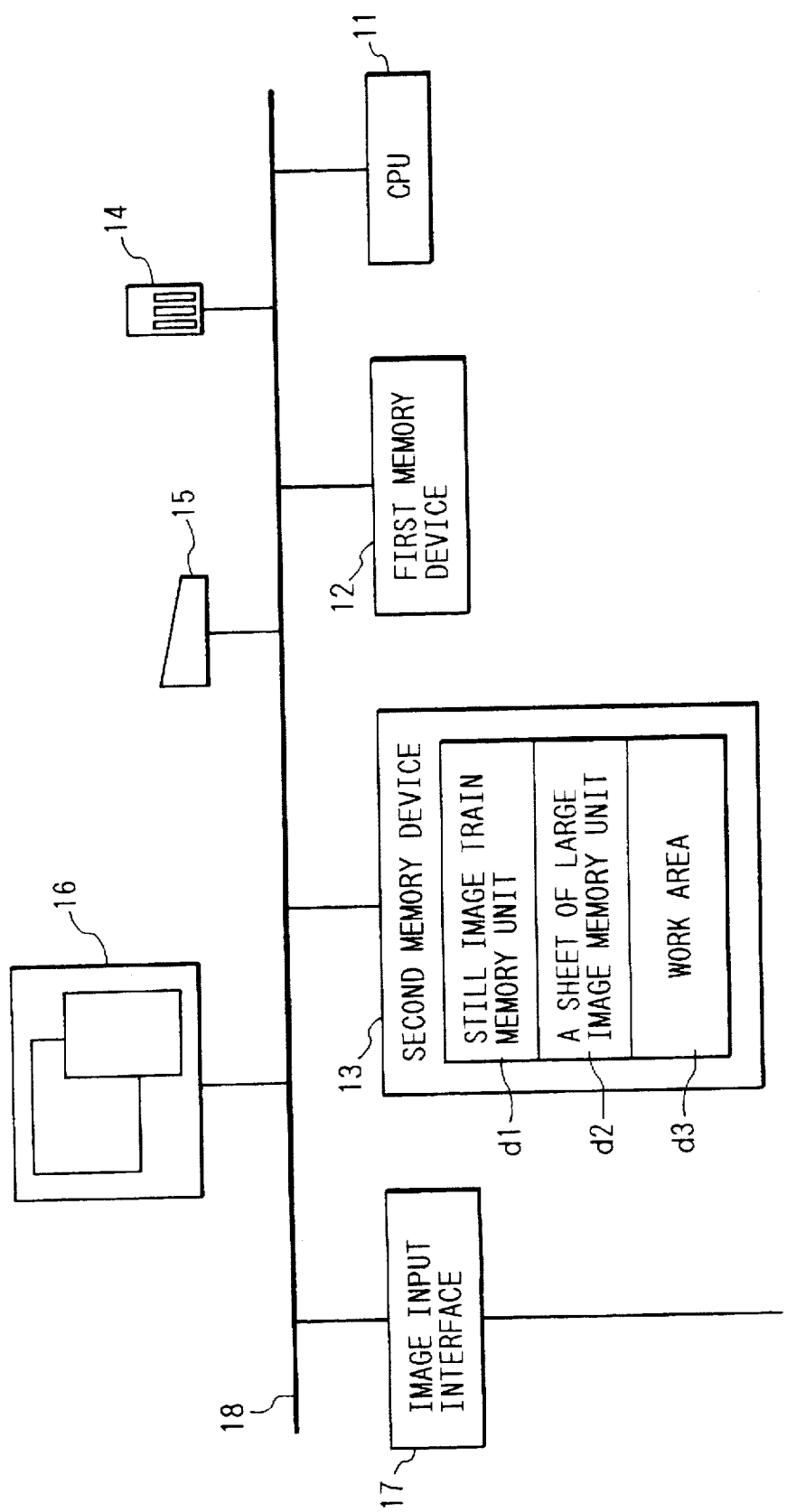
FIG. 2 is a block diagram showing an example of the image processing apparatus of the present invention.

FIG. 2 is a basic block diagram for explaining a detailed arrangement of the image processing apparatus of this embodiment.

Referring to FIG. 2, a CPU 11 controls and processes the processing procedures executed by the respective units arranged in the image processing apparatus of this embodiment.

A first memory device 12 stores programs that describe the processing procedures to be executed by the CPU 11.

A second memory device 13 has a still image train memory unit d1 for storing an image train input when an image input interface unit 17 (to be described later) inputs images in accordance with the processing program stored in the first memory device 12, a sheet of large image memory unit d2 for storing a sheet of large image produced, and a work area d3 for storing intermediate calculation results, and the like.

A mouse 14 serves as a position coordinate indication device which is used by an operator to indicate a point in an image.

A keyboard 15 is used for instructing a data name. A window system 16 serves as a display device for confirming image data.

The image input interface unit 17 fetches the still image train 9 shown in FIG. 1 into the second memory device 13. The still image train 9 is obtained in such a manner that dynamic images obtained from a dynamic image photographing device such as a video camera are A/D-converted by, e.g., a dynamic image digitizer, and the converted images are fetched as a time-serial still image train via the image input interface 17.

Figure 5:
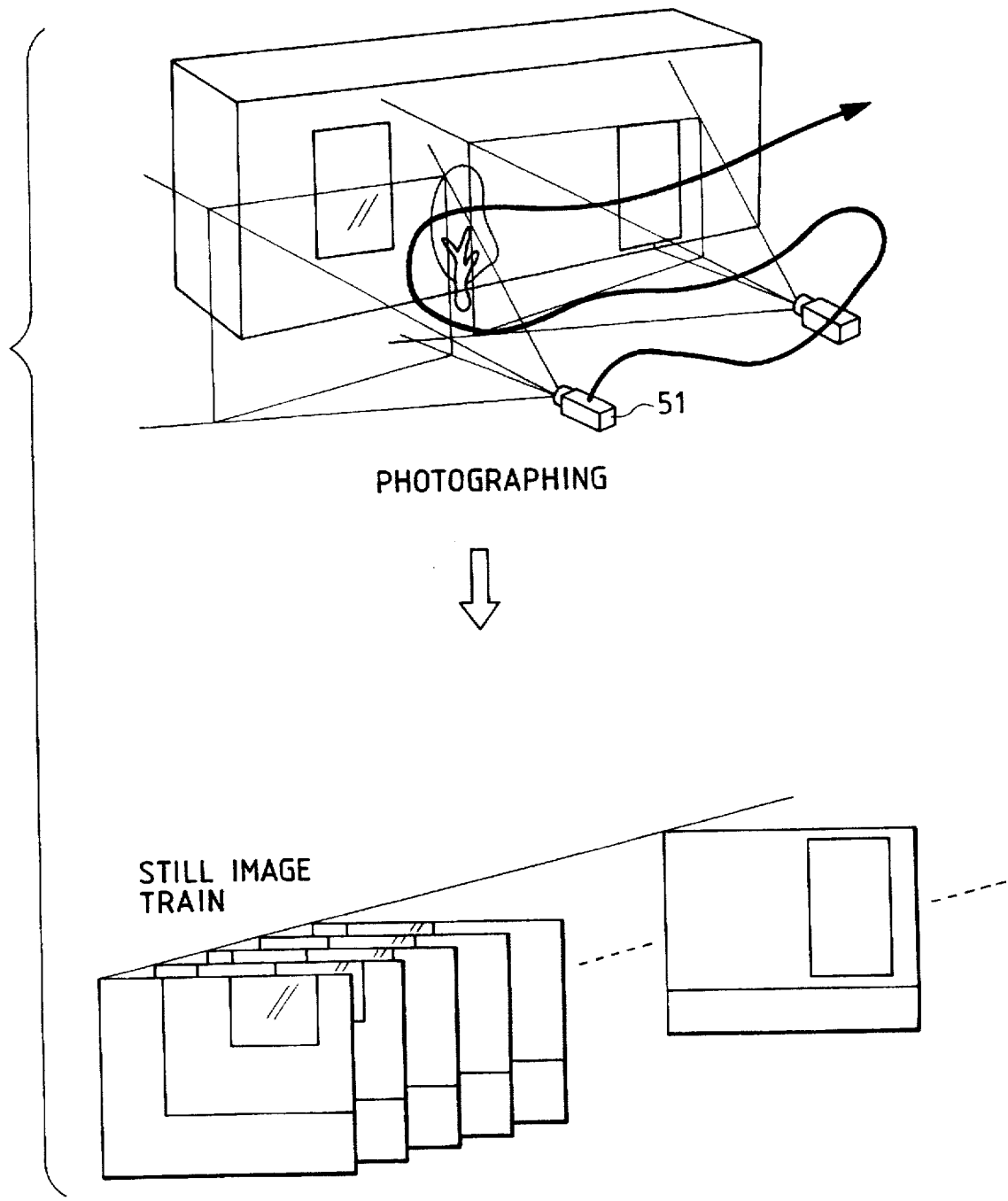
FIG. 5 is a view showing the photographing state of a still image train, and the still image train acquired by the photographing operation.

On the other hand, a group of photographs photographed using a still image photographing device such as a silver halide camera for photographing a still image while slightly changing the visual point position are A/D-converted by, e.g., a film scanner, and the converted images are fetched as a still image train via the image input interface 17. In this manner, the still image train can be acquired by various existing methods. FIG. 5 shows the photographing state and the acquired still image train 9. In FIG. 5, a video camera 51 acquires a still image train while following a path indicated by a bold line. In addition, a bus 18 constitutes an information transmission path in the image processing apparatus of this embodiment.

Figure 3:
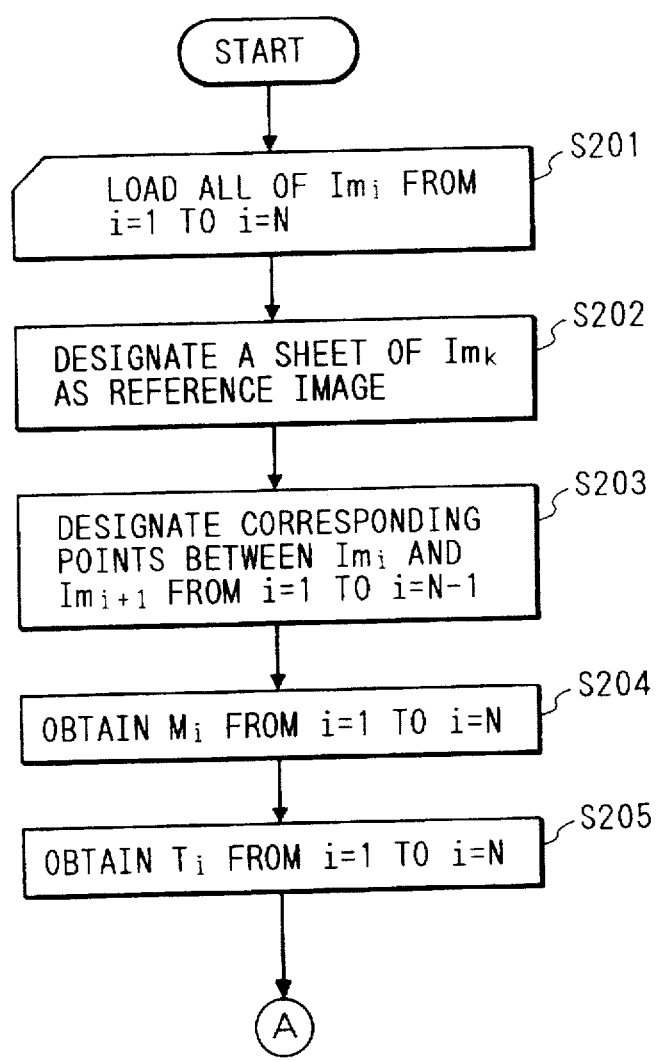
FIG. 3 is a flow chart showing the flow of the processing of an image processing apparatus according to the first embodiment of the present invention.
Figure 4:
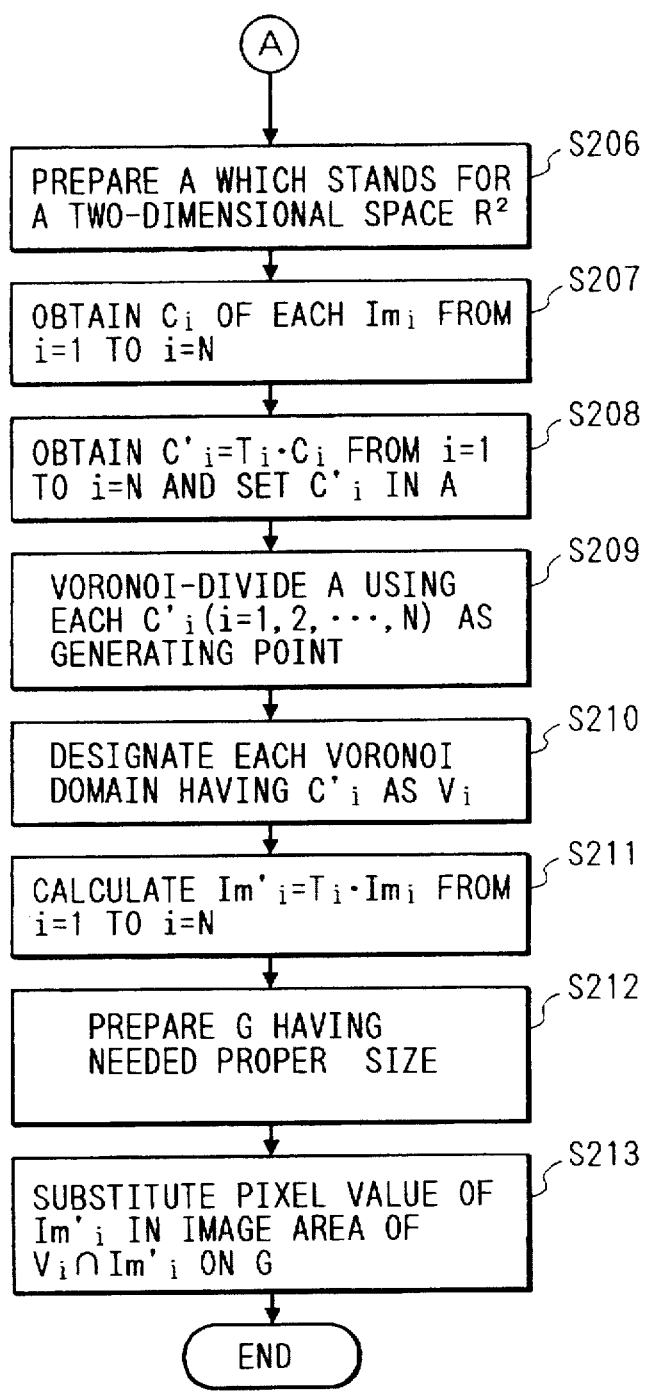
FIG. 4 is a flow chart showing the flow of the processing of an image processing apparatus according to the first embodiment of the present invention.

The operation of the image processing apparatus of this embodiment will be described below with reference to FIGS. 3 and 4. FIGS. 3 and 4 are flow charts showing the main flow of the respective processing operations executed using the image processing apparatus of this embodiment.

In step S201, processing for storing a still image train 9, which is acquired by some method, in the still image train memory unit d1 of the second memory device 13 (FIG. 2) via the image input interface unit 17 (FIG. 2) is performed.

Assume that, in step S201, still images in the input still image train 9 are given consecutive numbers, and a total of N images, i.e., first to Nth images are input. Furthermore, each image is expressed by $Im_i$ (i=1, 2, . . . , N).

The flow then advances to step S202, and one image $Im_K$ of these images is designated as a reference image. The designation method in step S202 is not particularly limited. For example, the first, last, or middle image may be designated, or an operator may designate an arbitrary image.

Note that the images in the still image train 9 are arranged in the movement order of the visual point. For this reason, adjoining images $Im_i$ and $Im_{i+1}$ (i=1, 2, . . . , N−1) of the image train have a high correlation therebetween.

Figure 6:
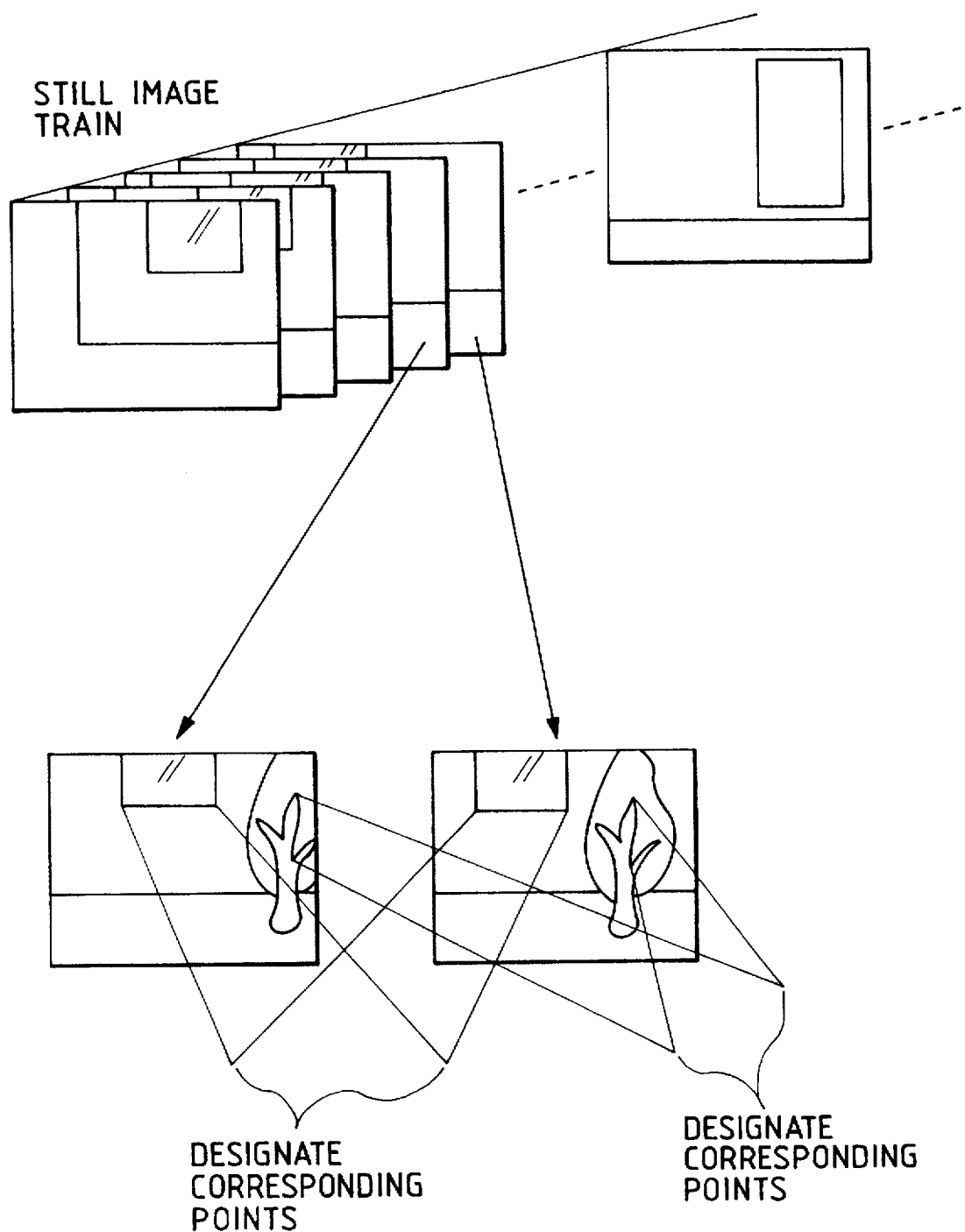
FIG. 6 is a view showing the designating state of corresponding points between adjoining images in the still image train.

Thus, in the next step S203, identical points photographed in adjoining images are designated from all the combinations of adjoining images as corresponding points by the position indication device such as a mouse. FIG. 6 shows this state.

In step S204, a transform matrix of an affine transformation for coordinate-transforming one of adjoining images to the other image so that corresponding points match each other between the adjoining images is calculated using the corresponding points designated in step S203.

Note that the affine transformation is a coordinate transformation for transforming (x, y) to (x', y') like in the following formulas:

$$x'=b_1x+b_2y+b_3, y'=b_4x+b_5y+b_6$$

This transformation can be expressed by the following matrices:

$$\begin{bmatrix} x' \\ y' \\ 1 \end{bmatrix} = \begin{bmatrix} b_1 & b_2 & b_3 \\ b_4 & b_5 & b_6 \\ 0 & 0 & 1 \end{bmatrix} \begin{bmatrix} x \\ y \\ 1 \end{bmatrix}, B = \begin{bmatrix} b_1 & b_2 & b_3 \\ b_4 & b_5 & b_6 \\ 0 & 0 & 1 \end{bmatrix} \quad (1)$$

Note that B in equation (1) is called the transform matrix of the affine transformation.

In the case of an image $Im_i$ which is present before the reference image $Im_K$ in the image train, i.e., when i<K, an affine transform matrix $M_i$ for transforming from the image $Im_i$ to an image $Im_{i+1}$ is calculated. In the case of an image $Im_i$ which is present before the reference image $Im_K$ in the image train, i.e., when i>K, an affine transform matrix $M_i$ for transforming from the image $Im_i$ to an image $Im_{i-1}$ is calculated.

Subsequently, in step S205, an affine transform matrix $T_i$ for transforming each image $Im_i$ to the reference image $Im_K$ is calculated using the calculated affine transform matrices $M_i$. When i<K, $T_i$ is calculated by $T_i=M_{K-1}\cdot\ldots\cdot M_{i+1}\cdot M_i$; when i>K, $T_i$ is calculated by $T_i=M_{K+1}\cdot\ldots\cdot M_{i-1}\cdot M_i$. In this manner, the affine transform matrices from the respective images to the reference image of the still image train 9 are obtained.

In step S206, A which stands for a two-dimensional space $R^2$ is prepared. This preparation is realized by setting an area for storing two-dimensional position information in the work area d3 of the second memory device 13 (FIG. 2).

In step S207, the image central point of each image $Im_i$ (i=1, 2, . . . , N) of the still image train is obtained, and is set in $C_i$.

In step S208, the image central point $C_i$ is transformed by the affine transform matrix $T_i$ to calculate $C_i'=T_i\cdot C_i$, thus obtaining an image central point $C_i'$. The image central point $C_i'$ is set in the two-dimensional space A. More specifically, the point position information is stored in the two-dimensional position information memory area.

Figure 7:
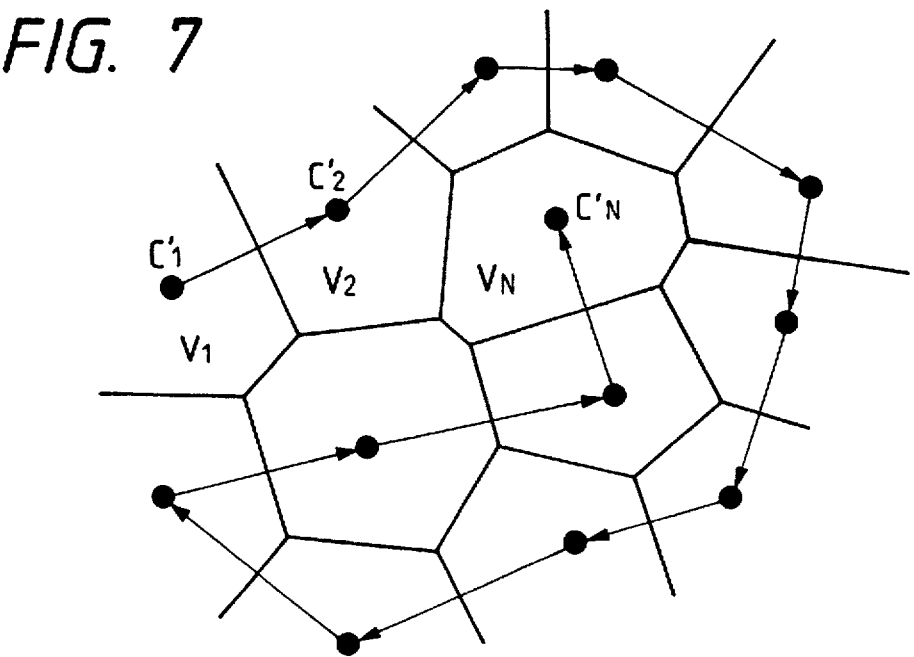
FIG. 7 is a view showing the Voronoi division state of a predetermined space.

In step S209, the predetermined space A is Voronoi-divided using each image central point $C_i'$ as a generating point, as shown in FIG. 7. In this processing, the boundary lines of Voronoi division domains are stored as line segment formulas in the two-dimensional position information memory area to store each Voronoi domain as a set of line segments.

The Voronoi division will be described in detail below. For example, a question about how to determine an oasis closest to a designated point P if oases $O_1, \ldots, O_n$ are present at n positions of a given desert will be examined below. When all distances $PO_i$ are calculated, and a minimum value of the calculation results is obtained, the question can be solved for a time proportional to n. However, if a map which illustrates territories of $O_i$, i.e., indicates that "$O_i$ is closest to the designated point within this range" is prepared in advance, the closest $O_i$ can be easily determined by checking a territory to which P belongs. Upon calculation of this territory, a two-dimensional Euclidean distance is used, and the map that illustrates the territories is called a Voronoi diagram. A Voronoi diagram of two points $O_1$ and $O_2$ is obtained by dropping a perpendicular bisector to a line connecting the points $O_1$ and $O_2$. Also, a Voronoi diagram of three points $O_1$, $O_2$, and $O_3$ is obtained by dropping perpendicular bisectors from the center of a circumscribed circle of a triangle $O_1O_2O_3$ to its respective sides. In general, a Voronoi diagram for n points is obtained by O(nlogn) steps, and when a Voronoi diagram and a point P are given, a territory to which P belongs can be determined by O(logn) steps. Domain division for obtaining such Voronoi diagram is called Voronoi division, and each of the divided domains is called a Voronoi domain.

In step S210, each Voronoi domain having the image central point $C_i'$ as a generating point is designated as $V_i$.

In step S211, each image $Im_i$ is affine-transformed to calculate $Im_i'=T_i\cdot Im_i$, thus obtaining an image $Im_i'$.

In this case, the coordinate value of the pixel position obtained by affine-transforming each pixel is stored in the still image memory unit d1 on the memory area d1 of the second memory device 13 that stores the images $Im_i$, thereby holding coordinate-transformed data.

In this manner, the value of each image $Im_i'$ can be substituted in the two-dimensional space satisfying $V_i \cap Im_i'$ as needed. Furthermore, in step S212, an image G having a needed proper size corresponding to a portion of the predetermined space A is prepared. More specifically, a memory area is prepared on the work area d3 of the second memory device 13.

Figure 8:
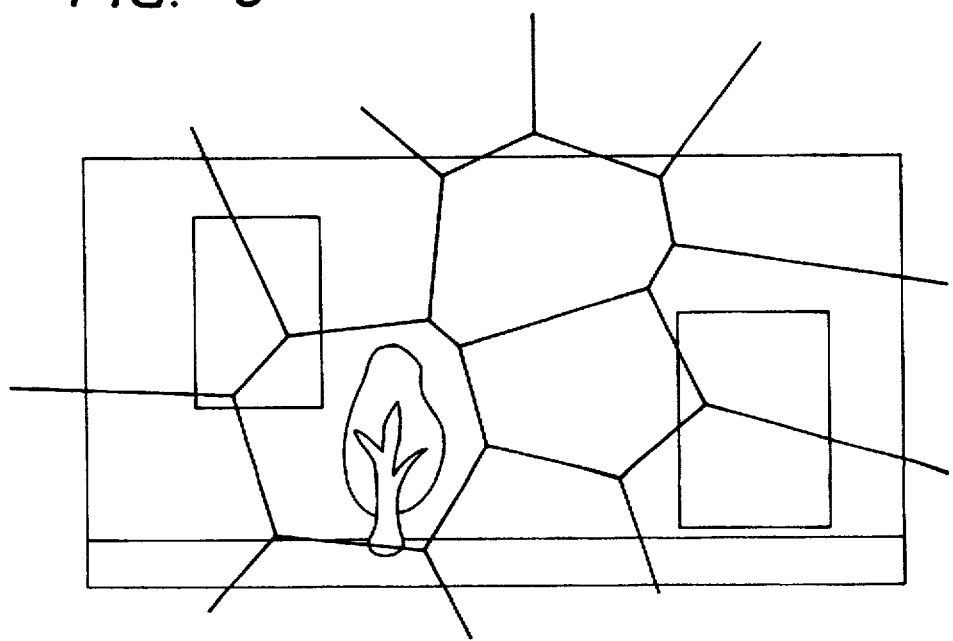
FIG. 8 is a view showing the image production state.

In the initial state, the image G has no values in its pixels. In step S213, the values of $Im_i'$ are substituted in image areas satisfying $V_i \cap Im_i'$ on the image G, thus producing the image G. FIG. 8 is a view for explaining steps S211 and S212. With the above-mentioned processing, an image sufficiently larger than the field angle can be acquired by the image processing.

(b) Second Embodiment

The second embodiment of the present invention will be described below.

In the second embodiment, step S203 of designating corresponding points in the first embodiment described above is realized not by designation using a mouse by an operator but by an image processing technique (image correlation method, template matching method, multiple resolution method (coarse to fine), or the like) which is used in corresponding point retrieval processing for stereoscopic images.

(c) Third Embodiment

The third embodiment of the present invention will be described below.

In the third embodiment, in step S207 in the first embodiment, the central point of each image is obtained using a point of a given coordinate value on each image in place of $C_i$ as a generating point of Voronoi division.

(d) Fourth Embodiment

The fourth embodiment of the present invention will be described below.

In the fourth embodiment, in the Voronoi division processing in step S209 in the first embodiment, the distance calculation used upon calculations of territories uses a distance calculation method taking other elements into consideration, in place of a simple two-dimensional Euclidean distance.

For example, the following methods may be used:

(1) a method of calculating distance in the screen in consideration of the lens distortion of the photographing system;

(2) a method of using distances which are weighted to assure a larger territory for an image with a higher resolution when both images with high and low resolutions are mixed; and (3) a method of using distances which are weighted depending on image quality when images with high and low qualities are mixed due to a change in sunshine condition and the like.

(e) Fifth Embodiment

The fifth embodiment of the present invention will be described below.

In the fifth embodiment, in steps S204 and S205 in the first embodiment, in place of the affine transformation, the coordinate transformation between images can use various other techniques for coordinate-transforming one two-dimensional coordinate to the other two-dimensional coordinate, for example, a projection transformation for transforming (x, y) to (x', y') like in the following formulas:

$$x' = \frac{b_1x + b_2y + b_3}{b_7x + b_8y + 1},$$

$$y' = \frac{b_4x + b_5y + b_6}{b_7x + b_8y + 1}$$

(2)

and, a pseudo affine transformation for transforming (x, y) to (x', y') like in the following formulas:

$$x' = b_1x + b_2xy + b_3y + b_4,$$

$$y' = b_5x + b_6xy + b_7y + b_8$$

(3)

As described above, according to the above embodiments, images which have time-varying visual point positions and directions can be superposed on a two-dimensional coordinate system identical to that of a reference image such that specific points in the images match each other between adjoining images. Thus, a single wide-angle image having a wide field angle, i.e., a field angle from that of the first image to that of the last images of the input still image train can be produced. As a result, an image having a field angle larger than that determined by the lens can be obtained by the image processing.

(f) Sixth Embodiment

<Arrangement of Apparatus of This Embodiment>

Figure 9:
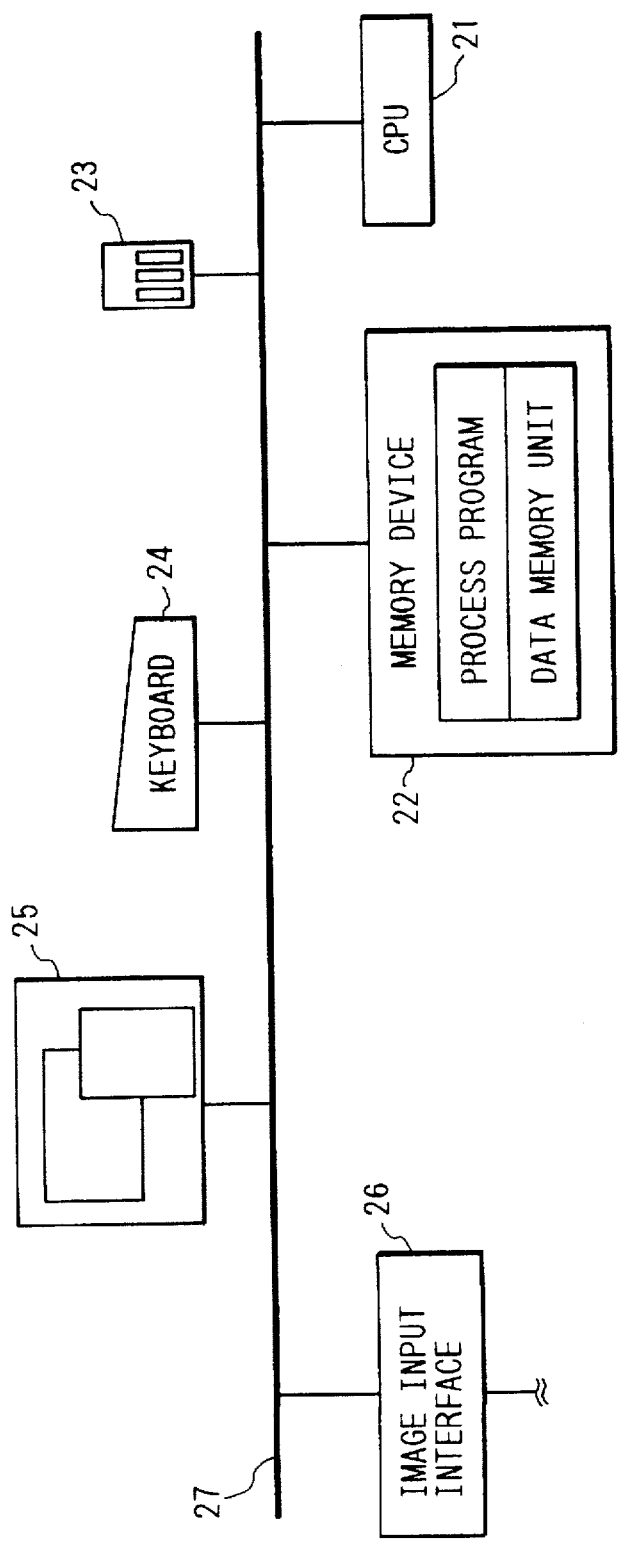
FIG. 9 is a block diagram showing the arrangement of an image processing apparatus according to the sixth embodiment of the present invention.

FIG. 9 is a block diagram showing the arrangement of an apparatus for realizing this embodiment.

The apparatus shown in FIG. 9 comprises a calculation/control CPU 21 for controlling this apparatus, a memory device 22 which has a data memory unit for storing control programs (to be described later) and data required for calculations and control, and comprises a ROM or RAM, a pointing device 23 such as a mouse used by an operator to input commands, a keyboard 24 used for inputting data and commands, and an image display device 25 controlled by a window system in this embodiment. The apparatus also comprises an image input interface 26 for inputting image data via an image reading device such as a scanner, or a medium or communication, and a bus 27 for connecting the above-mentioned constituting elements.

<Processing of Apparatus of This Embodiment>

Figure 10:
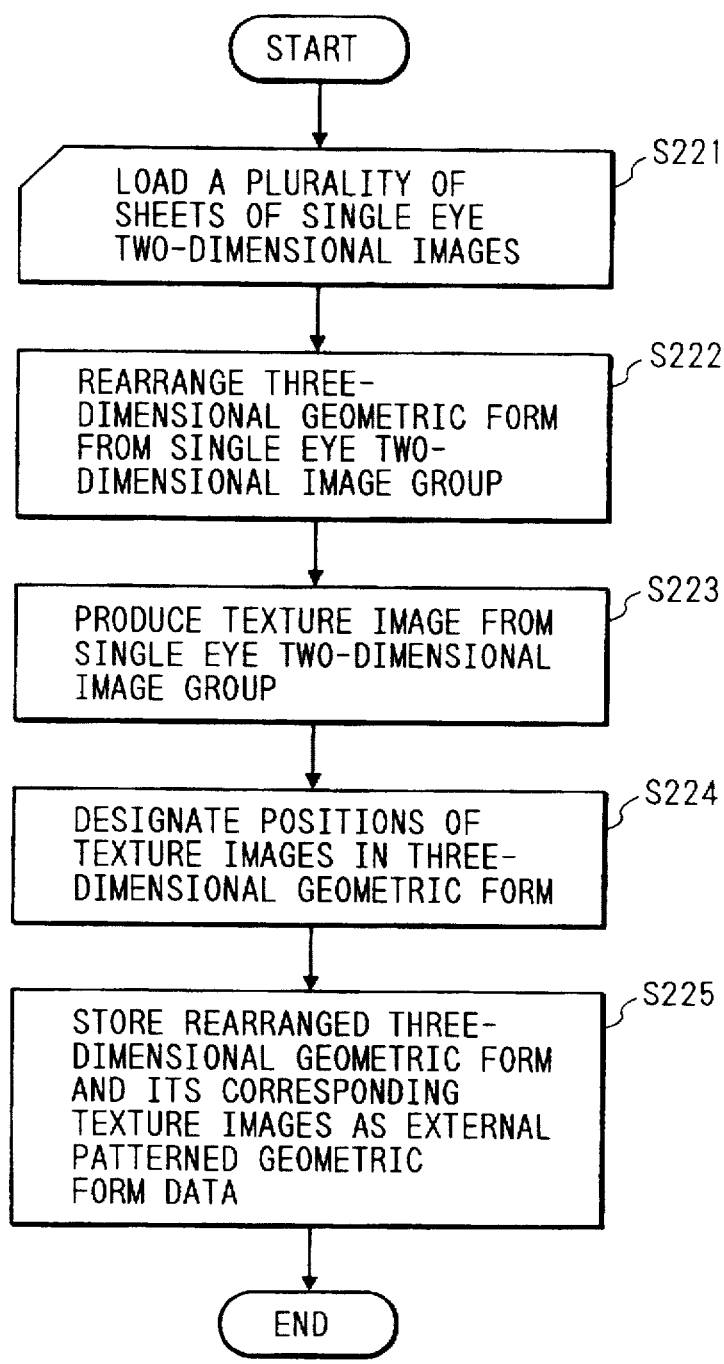
FIG. 10 is a flow chart showing the flow of the overall processing of the sixth embodiment.

FIG. 10 is a flow chart of this embodiment. The operation sequence will be described in detail below with reference to FIG. 10.

In step S221, single eye two-dimensional images such as scenes in a room are loaded. These images can be obtained by various methods such as a method of photographing a scene in a three-dimensional space such as a room from various directions and positions using a normal film type camera, and converting photographs into image data using a film scanner, a method of photographing dynamic images using, e.g., a video camera and digitizing the dynamic images as still images, or a method of directly and electronically obtaining image data using an electronic still camera.

In step S222, the form of the scene in the three-dimensional space is rearranged based on the group of images. In step S223, a three-dimensional scene is considered as a group of areas which are exactly or roughly equal to a plane, such as a wall, and the external patterns of these areas are acquired as texture images. In step S224, the positions of the texture images obtained in step S223 in the three-dimensional form obtained in step S222 are designated. Since the three-dimensional form and its external pattern are obtained in combination with the form, the rearranged three-dimensional form and its corresponding texture images are stored as external patterned geometric form data in step S225. Thereafter, the stored data can be rearranged as a patterned three-dimensional space using a conventional texture mapping technique for a three-dimensional geometric form.

Steps S222, S223, and S224 will be described in more detail below.

(Rearranging Procedure I: S222)

Figure 11:
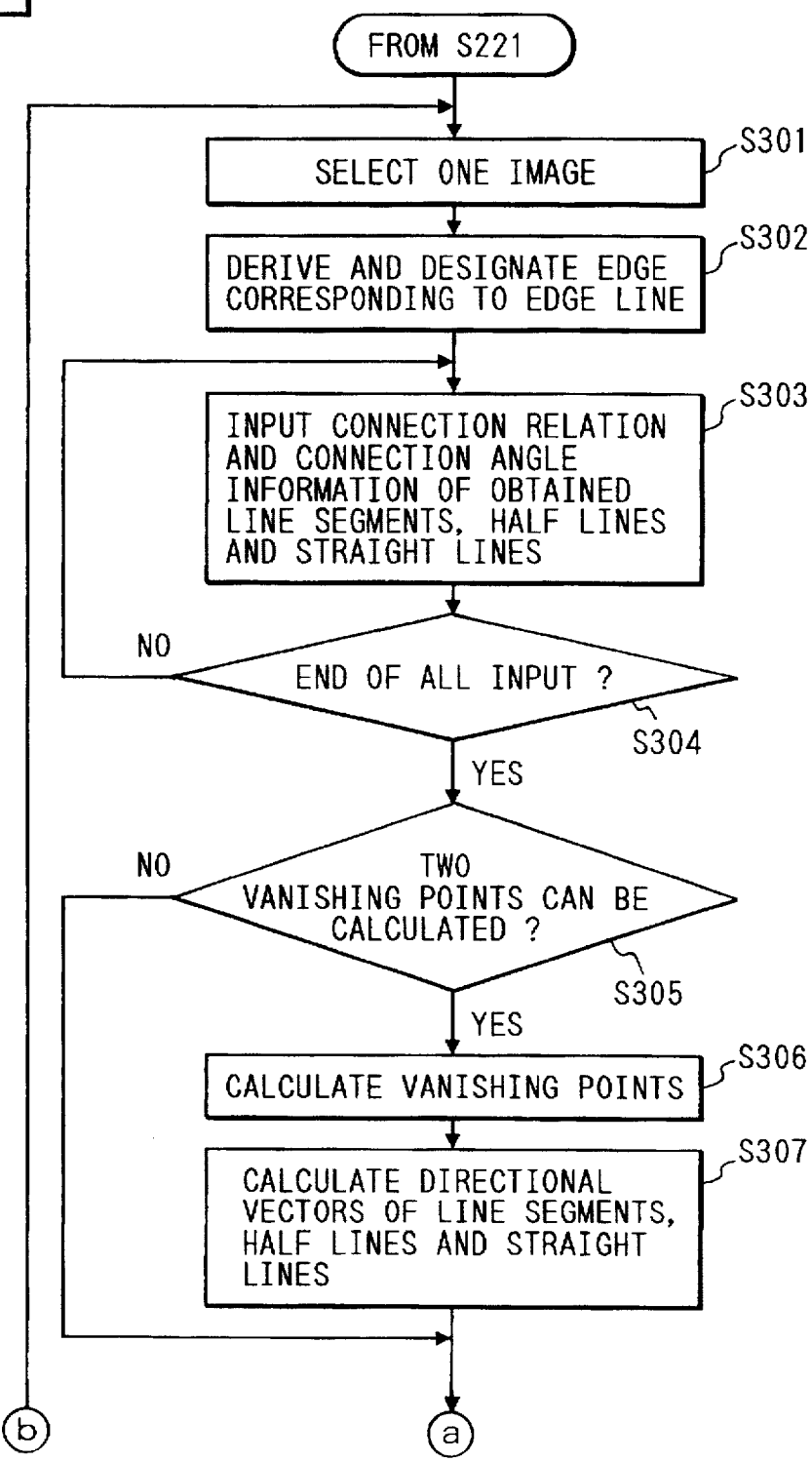
FIG. 11 which is composed of FIGS. 11A and 11B is a flow chart showing the flow of the processing in step S222 of the sixth embodiment.

The processing procedure for rearranging the form of an object in a scene in the three-dimensional space in step S222 will be described in detail below with reference to FIGS. 11A and 11B.

Figure 12:
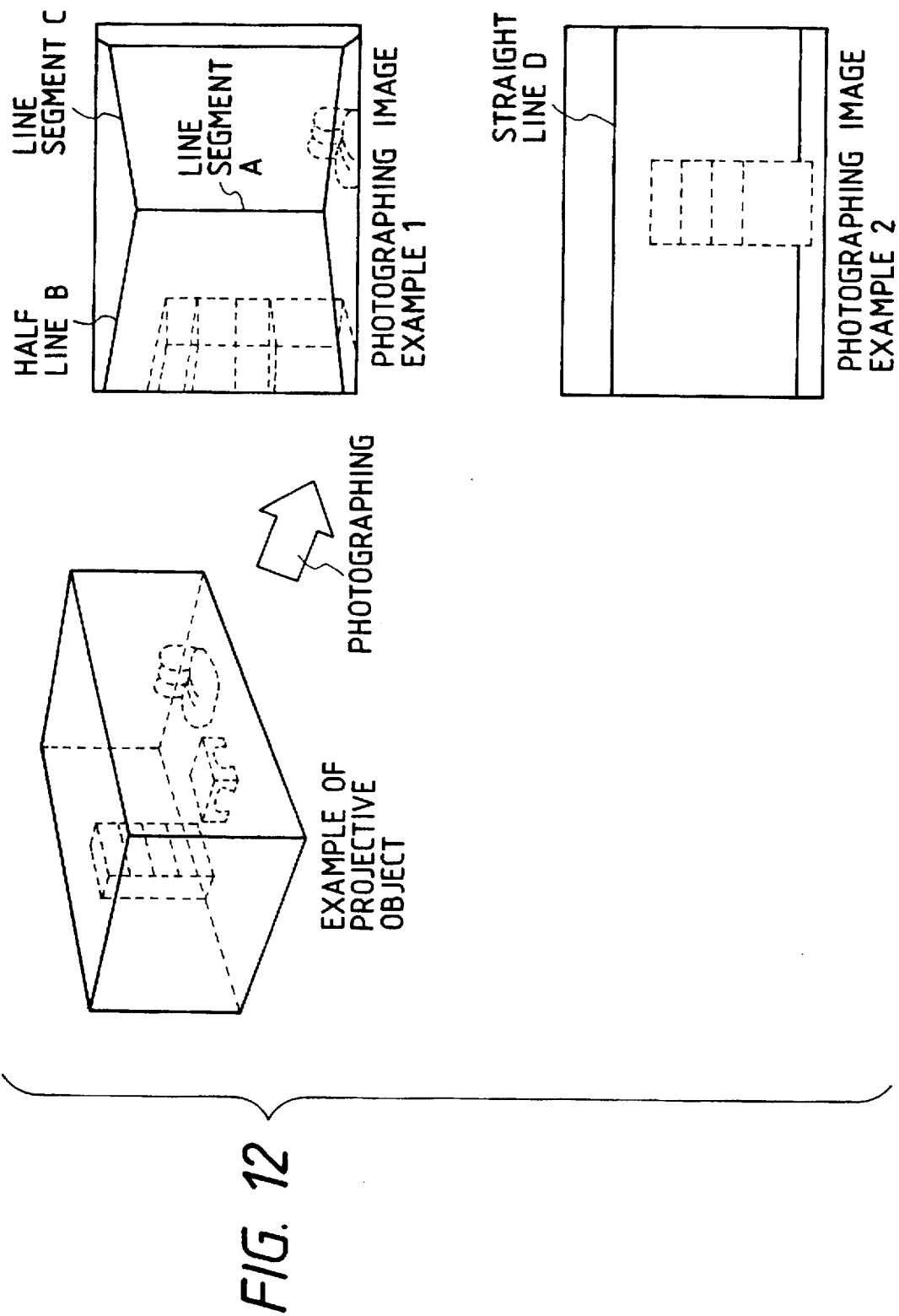
FIG. 12 is a view showing a straight line, half line, and line segment appearing in a photographing image.

In step S301, one image is selected. In this image, an edge in an image corresponding to an edge line of the three-dimensional form of an object in a scene such as the boundary between given adjoining walls is designated by the mouse (S302). At this time, the edge is expressed as (a) a line segment when the obtained edge has two end points in the image; (b) a half line when one end point of the edge is present in the image and the other end point is an open end outside the image; or (c) a straight line when neither of the two end points are present in the image. FIG. 12 shows this example.

In step S303, connection relation information and connection angle information of the line segments/half lines/straight lines obtained in step S302 are input. For example, in the case of photographing image example 1 in FIG. 12, information such as (1) line segment A and half line B are connected at their end points, and extend perpendicular to each other, (2) line segments A and C are connected at their end points, and extend perpendicular to each other, (3) half line B and line segment C are connected at their end points, and extend perpendicular to each other, and the like. On the other hand, in the case of photographing image example 2 shown in FIG. 12, for example, information indicating that only straight line D is present is input. Step S303 is repeated until the input operations of information that can be designated are completed (step S304).

In step S305, it is checked if two vanishing points can be calculated from the image. Note that the two vanishing points can be calculated when the line segments/half lines/straight lines designated in step S303 include two lines which extend parallel to each other in a real space, planes defined by the two parallel lines are perpendicular to each other, and the two parallel lines are not parallel to each other on the image plane. If YES in step S305, the flow advances to step S306. In step S306, vanishing points are calculated. The vanishing point is calculated as an intersection between two straight lines on the screen.

In step S307, the directional vectors of the line segments/half lines/straight lines in the image are obtained. The method in step S307 will be described in detail below.

Figure 13:
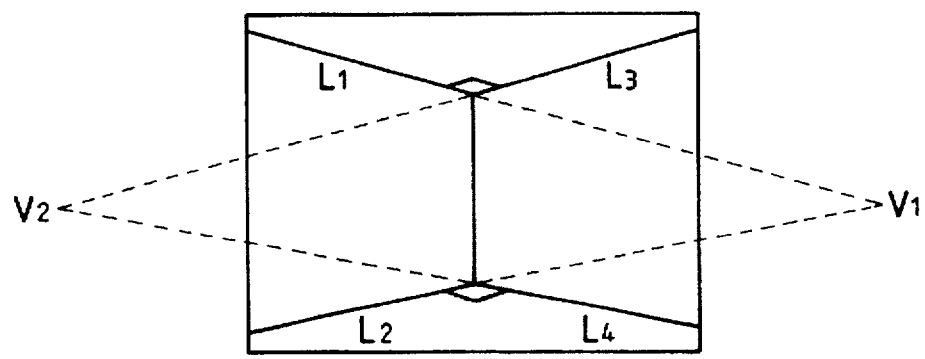
FIG. 13 is a view for helping explanation of a calculation formula of vanishing points.

First, the focal point of a camera that photographed images is obtained. As shown in FIG. 13, when four straight lines $L_1$, $L_2$, $L_3$, and $L_4$ in a three-dimensional space satisfy:

$L_1 \parallel L_2$, $L_3 \parallel L_4$ $L_1 \perp L_2$, $L_3 \perp L_4$ (∥ means parallel and ⊥ means perpendicular) if the intersection (vanishing point) between $L_1$ and $L_2$ is represented by $v_1$ and the intersection (vanishing point) between $L_3$ and $L_4$ is represented by $v_2$ ($v_1=(v_{11}, v_{12})$, $v_2=(v_{21}, v_{22})$), the distance between the photographing surface and the focal point position, i.e., the focal length (screen distance), c, is given by:

$$c=(v_1 \cdot v_2)^{1/2} \qquad (4)$$

Furthermore, if the directional vectors of $L_1$, $L_2$, $L_3$, and $L_4$ are represented by $D_1$, $D_2$, $D_3$, and $D_4$, these directional vectors are respectively given by:

$$D_1 = D_2 = \frac{1}{\sqrt{v_{11}^2 + v_{12}^2 + c^2}} \begin{bmatrix} v_{11} \\ v_{12} \\ c \end{bmatrix}^T \qquad (5)$$

$$D_3 = D_4 = \frac{1}{\sqrt{v_{21}^2 + v_{22}^2 + c^2}} \begin{bmatrix} v_{21} \\ v_{22} \\ c \end{bmatrix}^T \qquad (6)$$

Based on these directional vectors, the directional vectors of other line segments/half lines/straight lines are calculated by utilizing the relations of the line segments/half lines/straight lines.

On the other hand, if NO in step S305, the flow skips steps S306 and S307, and advances to step S308. The processing in these steps S301 to S307 is repeated until the processing for all the images is completed (step S308).

With steps S301 to S308, the forms each obtained from only a sheet of image are restored. Furthermore, in step S309, adjoining images which have neighboring photographing positions and directions of the camera are selected. In step S310, the connection relations and identities of the line segments/half lines/straight lines between the images are designated.

This processing is repeated until the end of all the designations (step S311). Furthermore, the processing is repeated until the end of designations between all the combinations of adjoining images (step S312). In step S313, the form of the entire scene is obtained from the form information newly added by the processing in steps S309 to S312 on the basis of the form obtained in steps S301 to S308.

(Pattern Acquisition Procedure: S223)

Figure 14:
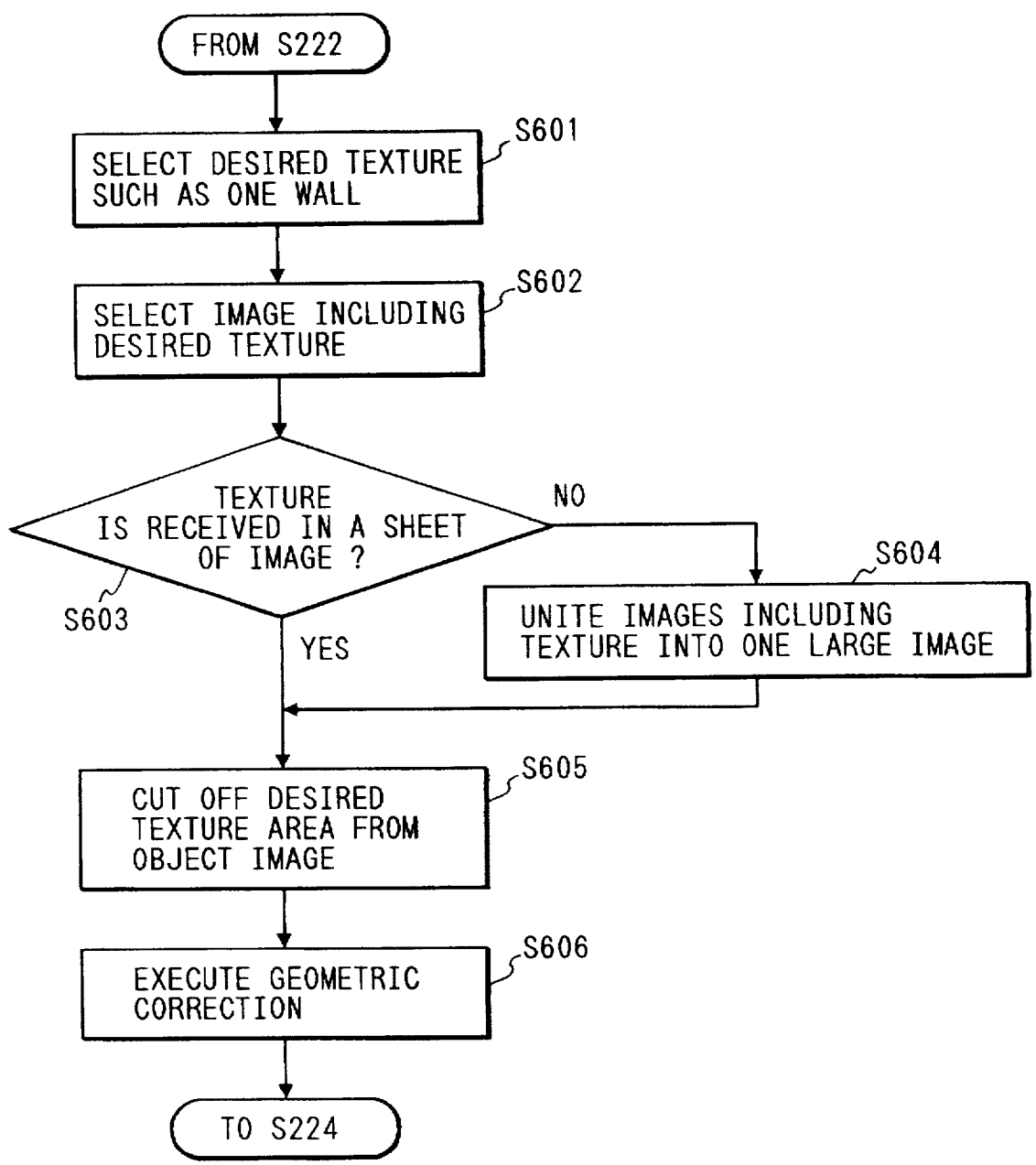
FIG. 14 is a flow chart showing the flow of the processing in step S223 in FIG. 10.

FIG. 14 is a flow chart showing step S223 of acquiring the external pattern of an object in the three-dimensional scene as a pattern image. Step S223 will be described in more detail below with reference to FIG. 14.

In step S601, a desired texture such as one wall is selected. In step S602, an image including the selected texture is selected from all the images. In step S603, it is checked if the desired texture is received in a sheet of image. If YES in step S603, the flow advances to step S605; otherwise, the flow advances to step S604.

If NO in step S603, the desired texture is present across a plurality of images. For this reason, a plurality of images including the texture are united into one large image in step S604.

(Synthesizing Procedure of a Plurality of Images: S604)

Figure 15:
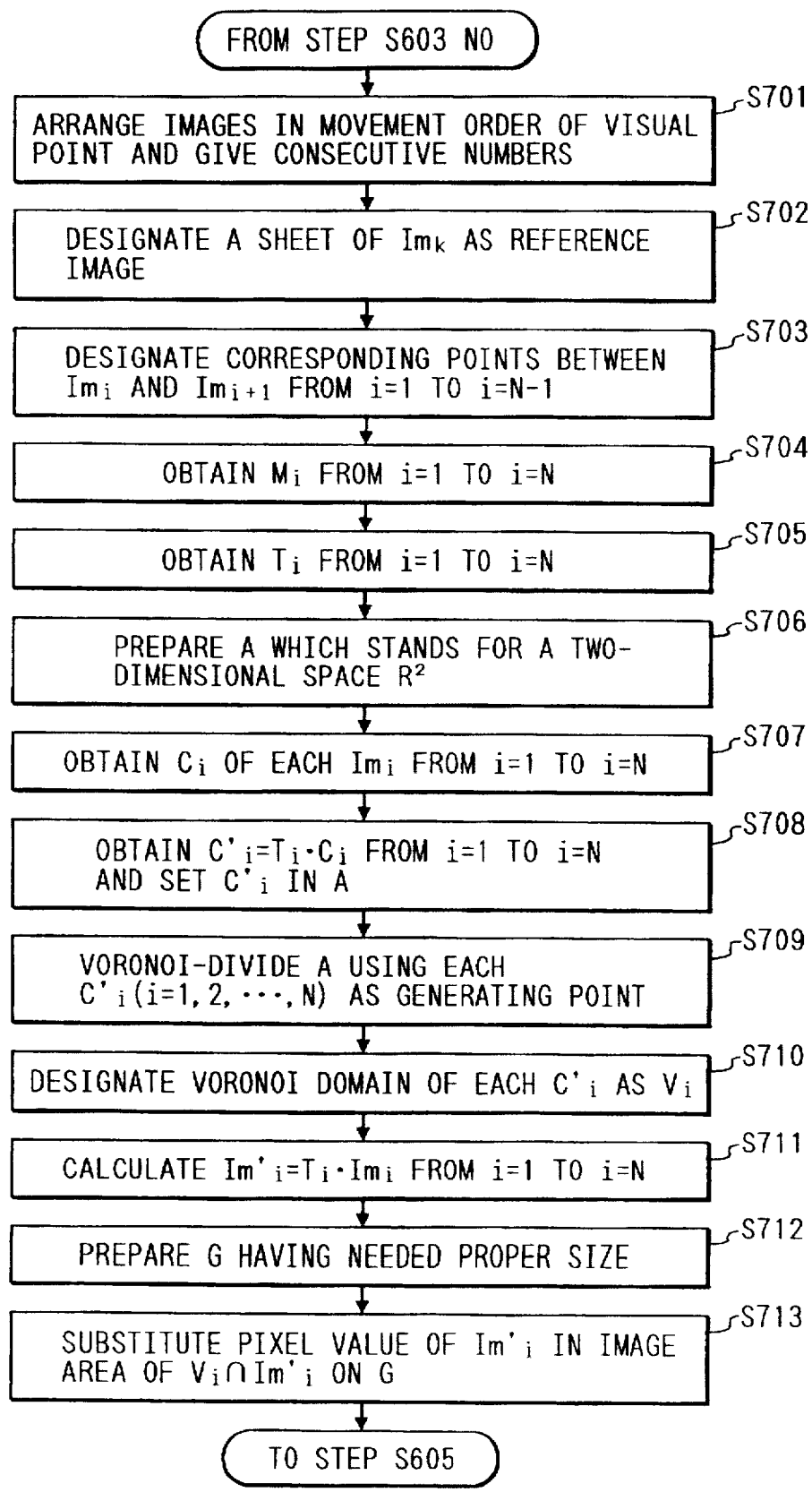
FIG. 15 is a flow chart showing the flow of the processing in step S604 in FIG. 14.

The processing in step S604 will be described in detail below with reference to FIG. 15.

First, images including the texture are arranged in the movement order of the visual point, and are given consecutive numbers to obtain a total of N images, i.e., first to Nth images (step S701). Furthermore, each image is expressed by $Im_i$ (i=1, 2, ..., N). One image $Im_K$ of these images is designated as a reference image in step S702. The designation method in step S702 is not particularly limited. For example, the first, last, or middle image may be designated, or an operator may designate an arbitrary image.

Since the images are arranged in the movement order of the visual point, adjoining images $Im_i$ and $Im_{i+1}$ (i=1, 2, ... N−1) of the images have a high correlation therebetween. Thus, in the next step S703, identical points photographed in adjoining images are designated from all the combinations of adjoining images as corresponding points by the position indication device such as a mouse. FIG. 6 above shows this state. In step S704, a transform matrix of an affine transformation for coordinate-transforming one of adjoining images to the other image so that corresponding points match each other between the adjoining images is calculated using the corresponding points designated in step S703. Note that the affine transformation is a coordinate transformation for transforming (x, y) to (x', y') like in the following formulas:

$$x'=b_1 x + b_2 y + b_3, \quad y'=b_4 x + b_5 y + b_6$$

This transformation can be expressed by the following matrices:

$$\begin{bmatrix} x' \\ y' \\ 1 \end{bmatrix} = \begin{bmatrix} b_1 & b_2 & b_3 \\ b_4 & b_5 & b_6 \\ 0 & 0 & 1 \end{bmatrix} \begin{bmatrix} x \\ y \\ 1 \end{bmatrix}, B = \begin{bmatrix} b_1 & b_2 & b_3 \\ b_4 & b_5 & b_6 \\ 0 & 0 & 1 \end{bmatrix} \qquad (7)$$

Note that B is called the transform matrix of the affine transformation.

In the case of an image $Im_i$ which is present before the reference image $Im_K$ in the image train, i.e., when i<K, an affine transform matrix $M_i$ for transforming from the image $Im_i$ to an image $Im_{i+1}$ is calculated. In the case of an image $Im_i$ which is present before the reference image $Im_K$ in the image train, i.e., when i>K, an affine transform matrix $M_i$ for transforming from the image $Im_i$ to an image $Im_{i-1}$ is calculated. Subsequently, in step S705, an affine transform matrix $T_i$ for transforming each image $Im_i$ to the reference image $Im_K$ is calculated using the calculated affine transform matrices $M_i$. When i<K, $T_i$ is calculated by $T_i=M_{K-1} \cdots M_{i+1} \cdot M_i$; when i>K, $T_i$ is calculated by $T_i=M_{K+1} \cdots M_{i-1} \cdot M_i$. In this manner, the affine transform matrices from the respective images to the reference image of the still image train are obtained.

In step S706, A which stands for a two-dimensional space $R^2$ is prepared. In step S707, an image central point of each image $Im_i$ (i=1, 2, ..., N) of the still image train is obtained, and is set in $C_i$. The image central point $C_i$ is transformed by the affine transform matrix $T_i$ to calculate $C_i'=T_i \cdot C_i$, thus obtaining an image central point $C_i'$. The image central point $C_i'$ is set in the two-dimensional space A (step S708). More specifically, the point position information is stored in a two-dimensional position information memory area.

In step S709, the predetermined space A is Voronoi-divided using each image central point $C_i'$ as a generating point, as shown in FIG. 7 above. In this processing, the boundary lines of Voronoi division domains are stored as line segment formulas in the two-dimensional position information memory area to store each Voronoi domain as a set of line segments. Each Voronoi domain having the image central point $C_i'$ as a generating point is designated as $V_i$ (step S710). In step S711, each image $Im_i$ is affine-transformed to calculate $Im_i'=T_i \cdot Im_i$, thus obtaining an image $Im_i'$. More specifically, the coordinate value of the pixel position obtained by affine-transforming each pixel is stored in the memory area of the memory device 22 that stores the images $Im_i$, thereby holding coordinate-transformed data. In this manner, the value of each image $Im_i'$ can be substituted in the two-dimensional space satisfying $V_i \eta Im_i'$ as needed.

Furthermore, in step S712, an image G having a needed proper size corresponding to a portion of the predetermined space A is prepared (a memory area is prepared in the memory device 22). In the initial state, the image G has no values in its pixels. In step S713, the values of $Im_i'$ are substituted in image areas satisfying $V_i \eta Im_i'$ on the image G, thus producing the image G. FIG. 8 above is a view for explaining steps S711 and S712.

With the above-mentioned processing, one large image including the texture can be produced from the images including the texture.

Figure 16:
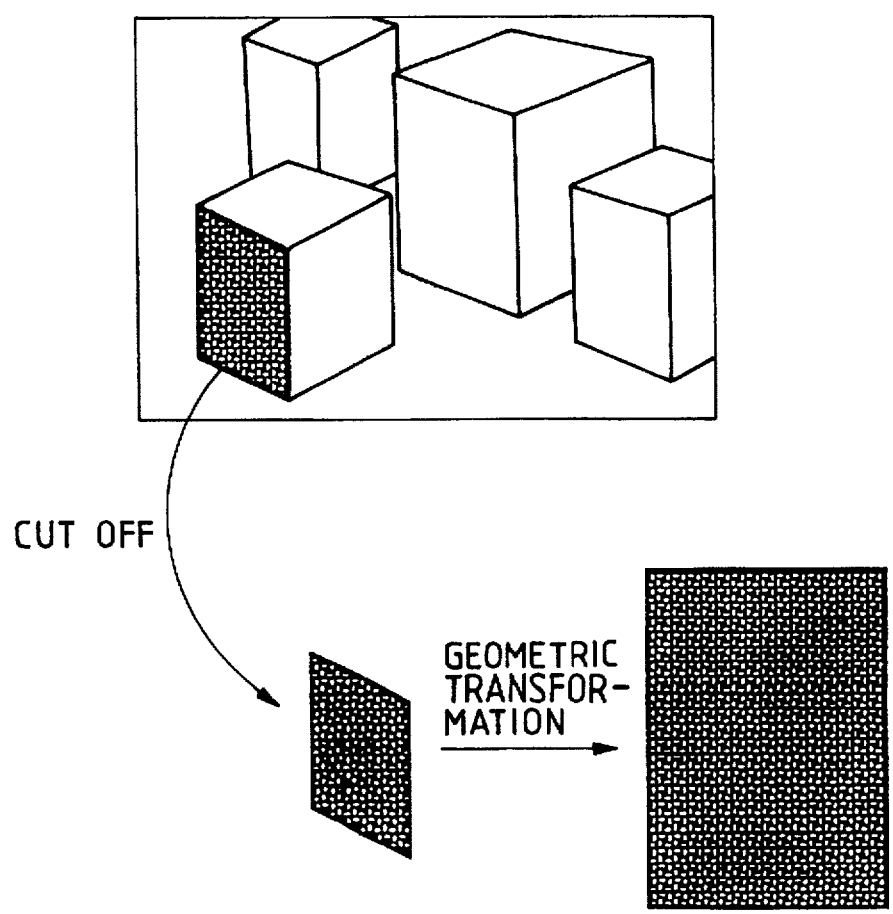
FIG. 16 is a view showing an example of geometric transformation of a texture.

In step S605, a texture area is cut off from the large image including the texture. This operation is attained based on an operator's instruction using the pointing device such as a mouse. Since the surface of the texture obtained in step S605 is not normally parallel to the photographing surface in the three-dimensional space, geometric distortion is generated in the image. In order to correct this distortion, geometric transformation of the texture is performed in step S606. FIG. 16 shows this example.

Note that this embodiment exemplifies only correction of geometric distortion. When a uniform shade and density are not obtained under the influence of the position and light amount of a light source, and the like, the nonuniform shade and density may be corrected. Also, when there is a portion concealed by, e.g., an obstacle, the portion may be corrected by interpolation or extrapolation.

(g) Seventh Embodiment

Figure 17:
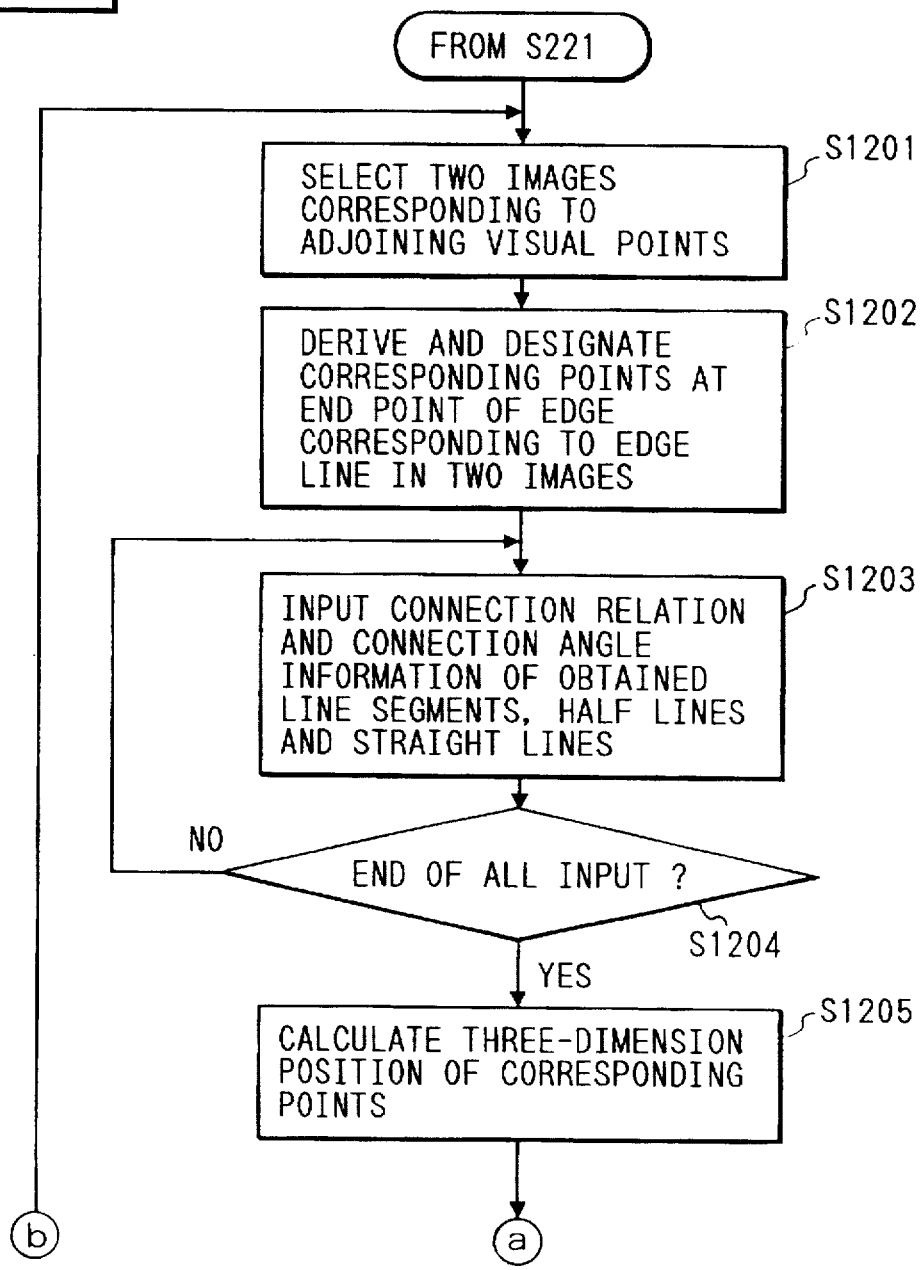
FIG. 17 which is composed of FIGS. 17A and 17B is a flow chart showing the flow of the processing in step S222 according to the seventh embodiment of the present invention.
Figure 17B:
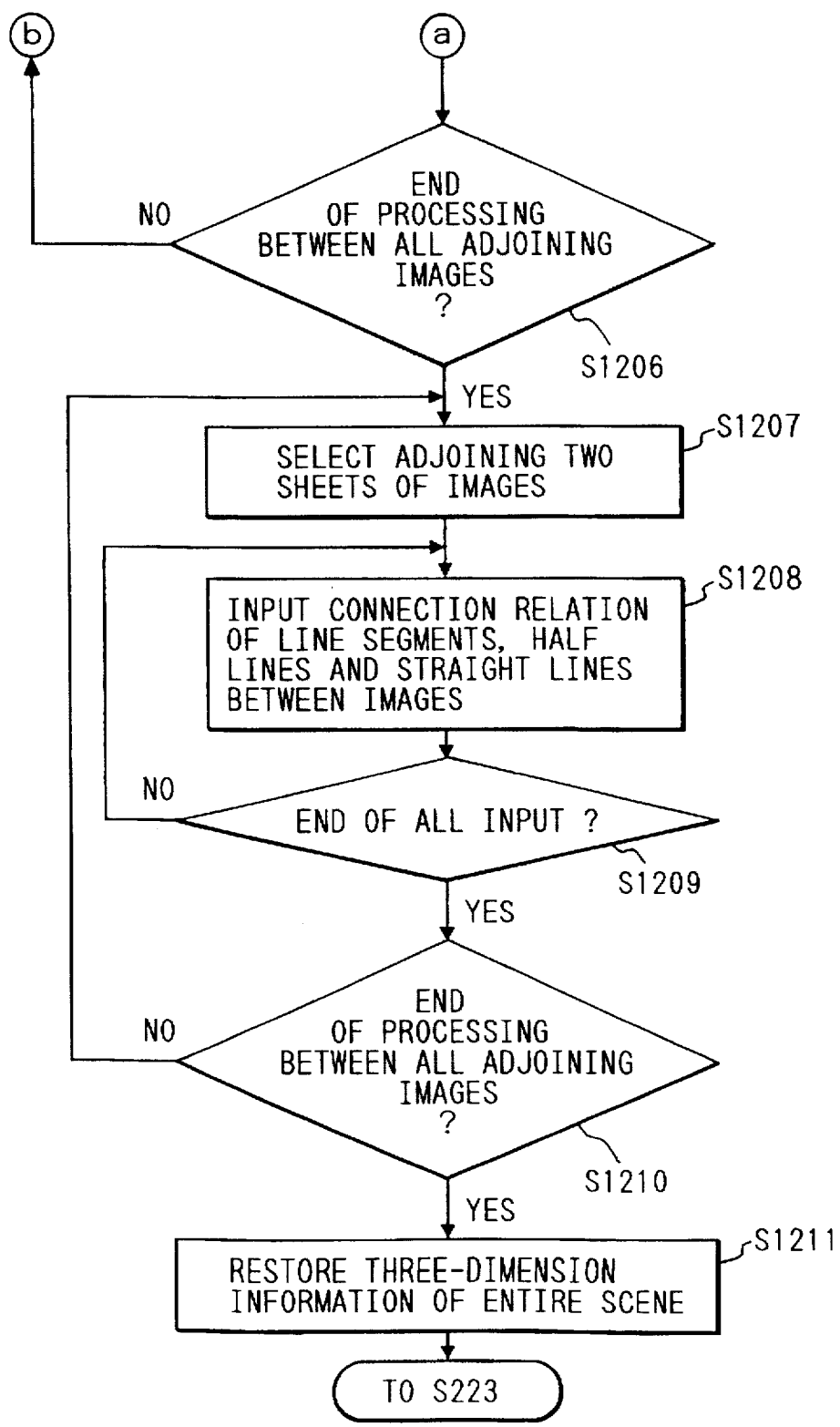

As in the sixth embodiment, the flow of the entire processing follows FIG. 10, i.e., steps S221 to S225. Of these steps, the processing in step S222 is performed as follows. The processing in step S222 will be described in detail below with reference to FIGS. 17A and 17B.

(Rearranging Procedure II: S222)

In step S1201, two images corresponding to adjoining visual points are selected. In these two images, an edge, commonly appearing in the two images, of those in images corresponding to the edge lines of the three-dimensional form of an object in a scene such as the boundary between given adjoining walls, and its end points are designated by the mouse (S1202). At this time, the edge is expressed as (a) a line segment when the obtained edge has two end points in the image; (b) a half line when one end point of the edge is present in the image and the other end point is an open end outside the image; or (c) a straight line when neither of the two end points are present in the image. FIG. 12 shows this example. The designated end points serve as corresponding points of the two images. In step S1203, connection relation information and connection angle information of the line segments/half lines/straight lines obtained in step S1202 are input. For example, in the case of photographing image example 1 in FIG. 12, information such as (1) line segment A and half line B are connected at their end points, and extend perpendicular to each other, (2) line segments A and C are connected at their end points, and extend perpendicular to each other, (3) half line B and line segment C are connected at their end points, and extend perpendicular to each other, and the like. On the other hand, in the case of photographing image example 2 shown in FIG. 12, for example, information indicating that only straight line D is present is input. Step S1203 is repeated until the input operations of information that can be designated are completed (step S1204).

In step S1205, the three-dimensional position of corresponding points of the two images is calculated by the principle of triangulation. The processing in steps S1201 to S1205 is repeated for all the combinations of adjoining images (step S1206).

Furthermore, in step S1207, images corresponding to adjoining visual points are selected. In step S1208, the connection relations and identities of the line segments/half lines/straight lines are designated between the images. This processing is repeated until the end of all the designations (step S1209). Furthermore, the processing is repeated until the end of designations between all the combinations of adjoining images (step S1210). In step S1211, the form of an object in the entire scene is obtained from the form information obtained by the processing in steps S1203 and S1208.

According to this embodiment, the rearranging method for the form and external pattern of an object in a three-dimensional scene and an apparatus therefor, which can easily create a geometric form model on the basis of, e.g., photographs of a building without measuring the heights and widths of walls of an actual building using a tape measure or the like can be provided. More specifically, the problem that there is no technique for easily creating a geometric form model from, e.g., photographs of a building without performing any cumbersome operations for measuring the heights and widths of walls of an actual building using a tape measure or the like when neither numeric value data such as a design drawing nor form model data created by a CAD are available, can be solved.

Note that the present invention may be applied to either a system constituted by a plurality of equipments or an apparatus consisting of a single device. Needless to say, the present invention may be applied to a case wherein the invention is attained by supplying a program to the system or apparatus. In this case, a storage medium that stores a program according to the present invention constitutes the present invention. By reading out the program from the storage medium to the system or apparatus, the system or apparatus operates in a predetermined way.

What is claimed is:

1. An image processing method executing:

image input processing for inputting a still image train obtained by photographing an object while time-serially changing a visual point position and direction;

reference image determination processing for determining one image of the still image train input by the image input processing as a reference image;

specific point selection processing for selecting, as specific points, identical points photographed in two adjoining images of images constituting the still image train;

first procedure derivation processing for deriving a procedure for coordinate-transforming one of the adjoining images to the other image so that the specific points selected in the specific point selection processing match each other between the adjoining images;

second procedure derivation processing for deriving a procedure for coordinate-transforming the specific points transformed by the procedure derived by the first procedure derivation processing onto a two-dimensional coordinate system identical to a two-dimensional coordinate system of the reference image;

division processing for dividing a two-dimensional space to which the reference image belongs into a plurality of domains in correspondence with the specific points transformed by the procedure derived by the second procedure derivation processing;

coordinate transformation processing for coordinate-transforming the images of the still image train onto the two-dimensional space to which the reference image belongs; and wide angle image production processing for producing a single image as a whole by inserting coordinate information of each of the images coordinate-transformed onto the two-dimensional space to which the reference image belongs into each of the divided domains divided in correspondence with the specific points of the images.

2. An image processing method comprising:

the first step of inputting a still image train obtained by photographing an object while time-serially changing a visual point position and direction;

the second step of selecting one image from the still image train as a reference image;

the third step of deriving a coordinate transformation procedure for transforming one of adjoining images to the other image so that pixels correspond to each other between the adjoining images in the still image train;

the fourth step of deriving a coordinate transformation procedure for transforming the respective images to the reference image using the coordinate transformation procedure derived in the third step;

the fifth step of transforming specific points in the respective images to a two-dimensional coordinate system identical to a two-dimensional coordinate system of the reference image using the coordinate transformation procedure derived in the fourth step;

the sixth step of Voronoi-dividing a two-dimensional space on the basis of the specific points which are transformed to the two-dimensional coordinate system identical to the two-dimensional coordinate system of the reference image;

the seventh step of coordinate-transforming the respective images using a coordinate transformation procedure for transforming the respective images to the reference image; and the eighth step of producing a single image by inserting coordinate information of each of the coordinate-transformed images into each of Voronoi domains including specific points of the images.

3. A method according to claim 2, wherein a distance used upon calculation of territories of the respective divided domains in the sixth step is a two-dimensional Euclidean distance.

4. A method according to claim 2, wherein a distance used upon calculation of territories of the respective divided domains in the sixth step is a distance derived from a calculation formula taking elements other than a two-dimensional Euclidean distance into consideration.

5. An image processing apparatus comprising:

image input means for inputting a still image train obtained by photographing an object while time-serially changing a visual point position and direction;

reference image selection means for selecting one image from the still image train as a reference image;

first derivation means for deriving a coordinate transformation procedure for transforming one of adjoining images to the other image so that pixels correspond to each other between the adjoining images in the still image train;

second derivation means for deriving a coordinate transformation procedure for transforming the respective images to the reference image using the coordinate transformation procedure derived by said first derivation means;

first coordinate transformation means for transforming specific points in the respective images to a two-dimensional coordinate system identical to a two-dimensional coordinate system of the reference image using the coordinate transformation procedure derived by said second derivation means;

Voronoi division means for Voronoi-dividing a two-dimensional space on the basis of the specific points which are transformed to the two-dimensional coordinate system identical to the two-dimensional coordinate system of the reference image;

second coordinate transformation means for coordinate-transforming the respective images using a coordinate transformation procedure for transforming the respective images to the reference image; and wide angle image production means for producing a single image by inserting coordinate information of each of the coordinate-transformed images into each of Voronoi domains including specific points of the images.

6. An apparatus according to claim 5, wherein a distance used upon calculation of territories of the respective divided domains in said Voronoi division means is a two-dimensional Euclidean distance.

7. An apparatus according to claim 5, wherein a distance used upon calculation of territories of respective divided domains in said Voronoi division means is a distance derived from a calculation formula taking elements other than a two-dimensional Euclidean distance into consideration.

* * * * *

UNITED STATES PATENT AND TRADEMARK OFFICE
CERTIFICATE OF CORRECTION

PATENT NO. : 5,727,093

DATED : March 10, 1998

INVENTOR(S) : SHINJI UCHIYAMA, ET AL.

It is certified that error appears in the above-identified patent and that said Letters Patent is hereby corrected as shown below:

COLUMN 14

Line 4, "instep" should read --in step--.

Signed and Sealed this

Eighteenth Day of August, 1998

Attest:

BRUCE LEHMAN

Attesting Officer

Commissioner of Patents and Trademarks